Feb. 28, 1939.  C. H. LINN  2,148,699

WHEEL

Filed Sept. 25, 1936

Inventor
Clyde H. Linn,
By Richard Shepard
his Attorneys

Patented Feb. 28, 1939

2,148,699

UNITED STATES PATENT OFFICE 2,148,699

WHEEL

Clyde H. Linn, New Brighton, Pa.

Application September 25, 1936, Serial No. 102,614

2 Claims. (Cl. 152—411)

This invention relates to wheels for carrying pneumatic tires, and the prime object of the invention is to facilitate the application and removal of a tire from the wheel in a very simple and effective manner.

In carrying out the invention, the wheel is divided in the plane thereof into inner and outer sections, the inner section to be secured to the axle in any common or preferred manner, provision being made for detachably securing the outer section to the inner section. The connecting means is readily accessible for convenient manipulation, and the parts thereof are housed within the wheel in a very simple and efficient manner.

With these and other objects in view, the present invention consists in the combination and arrangement of parts as will be hereinafter more fully described, illustrated in the accompanying drawing, and particularly pointed out in the appended claims, it of course being understood that changes in the form, proportion, size and minor details may be made within the scope of the claims, without departing from the spirit or sacrificing any of the advantages of the invention.

Figure 1:
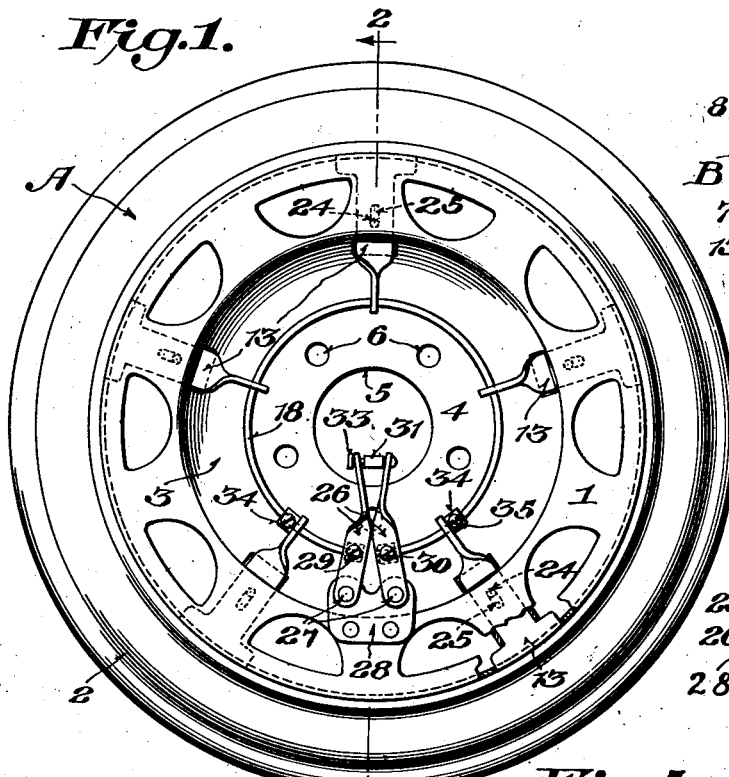
Figure 1 is an elevation of the inner section of the wheel looking at the outer side thereof, the wheel section locking means being in retracted or unlocked position.

The wheel of the present invention includes separate sections, an inner section A which is to be fixed to an axle, and the outer section B which is to be detachably secured to the inner section A. While these wheel sections may be of any desired form or configuration, they have been shown as defining a conventional metal wheel of the disc type with the rim or peripheral portions thereof configured in accordance with standard practice to receive the inner peripheral portion of the casing of a conventional pneumatic tire. The wheel section A includes a disc body portion 1 and a cylindrical rim portion 2. These parts may be pressed from a single blank, as shown in the drawing, or may be otherwise constructed as may be desired. The rim 2 is of course given any standard or preferred configuration to fit the inner edge portion of the tire casing. The disc body 1 is dished as at 3 so that the dished portion lies within the rim of the wheel section. The flat back wall 4 of the dished part is provided with a central opening 5 to give access to the adjacent end of an axle on which the wheel is mounted. The part 4 is also provided with a plurality of openings 6 to receive the bolts or other fastening means for rigidly securing the wheel section to the hub of the axle.

Figure 2:
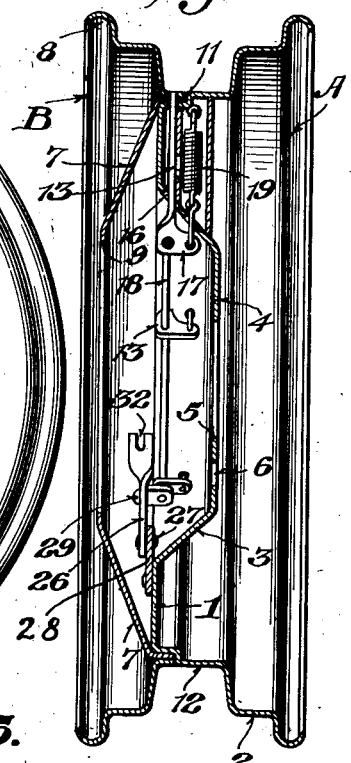
Figure 2 is a cross-sectional view on the line 2—2 of Figure 1 showing the complete wheel.
Figure 4:
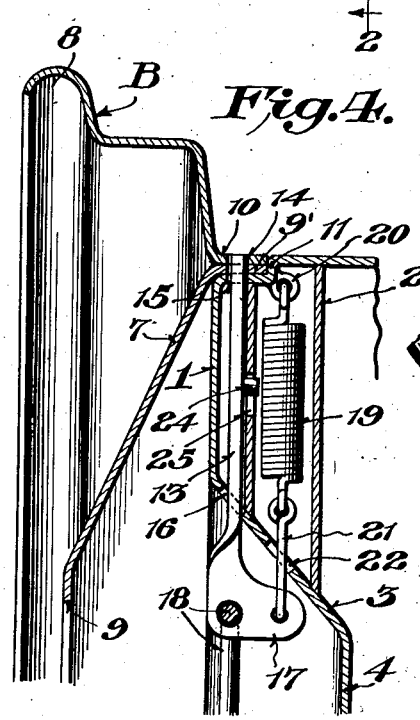
Figure 4 is an enlarged fragmentary sectional view showing the interfitting of the wheel sections with one of the locking bolts in locked position.
Figures 3, 5:
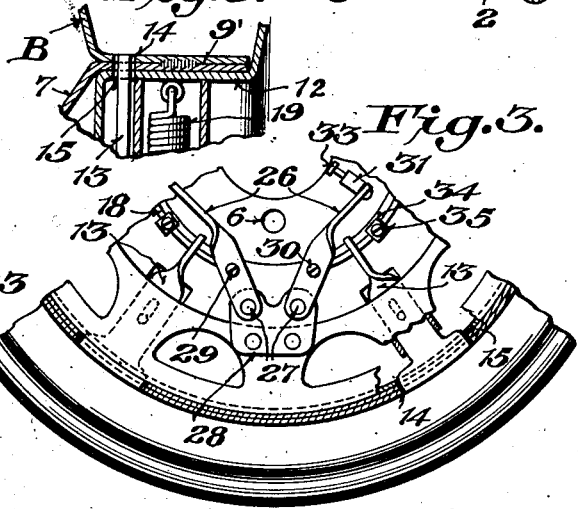
Figure 3 is a fragmentary side elevation showing the wheel section connecting means in position for connecting the wheel sections.
Figure 5 is an enlarged fragmentary sectional view illustrating a slight modification in the interfitting of the wheel sections.

The outer wheel section B includes a disc body portion 7 dished to lie within the cylindrical rim portion 8. A central opening 9 of suitable size is formed in the body portion 7 so as to give access to the interior of the wheel. This opening is designed to be normally closed by any suitable form of hub cap. At the outer periphery of the body portion 7 there is an outstanding cylindrical flange 9', and the inner edge of the portion 8 is provided with an outstanding cylindrical flange 10 embracing and extending around the flange 9'. These flanges are suitably secured together as by spot welding, riveting or otherwise and constitute a cylindrical flange outstanding from the inner face of the wheel section B. This outstanding flange embraces a portion of the rim 2 of the wheel section A as best shown in Figures 2, 4 and 5. In Figures 2 and 4, the rim of the wheel section A is configured to form an annular seat 11 in which the flange of the wheel section B is received, whereas in Figure 5, the rim of the wheel section A does not have such a seat, and the flange of the wheel section B extends entirely across the rim portion 12 of the wheel section A.

The means for detachably connecting the wheel sections consists of a plurality of bolts, each of which is designated 13 and is mounted for endwise movement in a radial direction upon the wheel section A. Each bolt is designed to have its outer end lie within registered slots or openings 14 and 15 in the overlapped portions of the flange portion of the wheel section B and the rim of the wheel section A whereby said sections are locked against sidewise separation and also against circumferential looseness. The inner end of each bolt works through an opening 16 in the dished portion 3 of the wheel section A, and is provided with an enlarged foot portion 17 which is provided with an opening through which loosely passes a split ring 18, whereby all of the bolts are connected for simultaneous operation. Each bolt is held at its outward limit in locking position by means of a coiled spring 19, the outer end of which is secured to the rim of the wheel section A as at 20 while its inner end is connected by a link 21 to the foot portion 17 of the bolt and passes loosely through an opening 22 provided in the dished portion 3 of the wheel section A. A suitable casing 23 surrounds the spring for protective purposes. A stud or projection 24 is provided upon the bolt and works in a slot 25 provided in the adjacent side of the casing 23, the ends of the slot constituting stops to positively limit the outward and inward movements of the bolt.

For the purpose of simultaneously withdrawing the bolts against the outward urge of their springs, there is provided means consisting of a pair of levers 26, each fulcrumed as at 27 upon the body portion 1 of the wheel section A. For this purpose a plate 28 is riveted or otherwise rigidly secured to the disc body portion 1 and projects inwardly across the dished portion 3 of the wheel section A so as to afford convenient fulcrum points for the levers. The levers 26 are connected intermediate their ends with the respective ends of the split ring 18 as indicated at 29 and 30. Referring to Figure 3 of the drawing, it will be seen that, with the locking bolts in their outward and locked positions, with the outer ends of the bolts lying within the registered openings 14 and 15, the levers will be spread apart, and the entire locking mechanism, including the manipulating means therefor, will be rigidly held in this condition by the several springs 19. By moving the outer free ends of the levers inwardly from the position shown in Figure 3 to the position shown in Figure 1, the ends of the split ring 18 will be drawn together, thereby decreasing the diameter of the ring and simultaneously withdrawing the bolts from their locked positions shown in Figure 3 to their unlocked positions shown in Figure 1, whereby the removable wheel section B may be conveniently removed from the wheel section A, thereby permitting the very convenient sidewise removal of the tire from the wheel section A, as there are no obstructions on the wheel section A to interfere with the convenient removal of the tire. Of course the tire should be at least partially deflated prior to removing it from the wheel section A.

For holding the lock manipulating means in the retracted positions of the bolts, a latch member 31 is loosely secured to the outer or free end of one of the levers 26, and the outer free end of the other lever is provided with a notch or bifurcation 32 in which the shank portion of the latch member 31 is designed to be received, the outer end of the latch member being provided with an enlargement or head 33 to extend across the notch or bifurcation 32 and hold the outer ends of the levers together as shown in Figure 1 of the drawing. Each end portion of the split ring 18 is provided with an adjustable stop 34 in the form of a block having an opening through which the ring passes, and a set screw 35 whereby the block may be adjustably secured upon the ring. Each of these blocks constitutes a stop for engagement with the foot portion of the adjacent locking bolt, in the manner shown in Figure 1 of the drawing, so as to limit the contraction of the split ring 18. As shown in Figure 3, the stop members 34 are not in contact with the foot portions of the adjacent bolts. While the outer end of each bolt is enlarged so as to give a T-shape to the bolt and thereby obtain a greater bearing area upon the walls of the aligned slots 14 and 15, this shape is not absolutely necessary.

From the foregoing description, it will be readily understood that access to the levers 26 may be very conveniently had through the opening 9 in the outer wheel section B, whereby the levers 26 may be conveniently drawn together from their positions shown in Figure 3 to their positions shown in Figure 1 and the latch member 31 snapped into position, whereby the locking bolts 13 will be withdrawn from their locking positions shown in Figures 2, 3 and 4 to their unlocked positions shown in Figure 1, and then the wheel section B may be conveniently removed, and the bolts will be maintained in their retracted positions. Upon returning the wheel section B to its position on the wheel section A, the latch 31 may be pushed out of the notch 32, whereupon the springs 19 will be released and will return to their normal conditions, thus forcing the locking bolts outwardly into their locked positions with the wheel sections A and B effectually locked together and the tire held properly between the wheel sections after the tire has been inflated.

What I claim is:

1. A vehicle wheel comprising a central body and an outer tire receiving rim divided in the plane of the wheel into inner and outer wheel sections having lapped rim portions, said lapped rim portions having registered openings, radially disposed bolts mounted upon said inner wheel section for movement into respective aligned openings in the lapped rim portions, spring means for yieldably maintaining the locking bolts in their locked positions, and control means for simultaneously withdrawing the bolts, said control means including a split ring connected with the respective bolts, levers connected to the respective ends of the split ring and fulcrumed upon the inner wheel section, and latch means for holding the levers in the retracted positions of the bolts.

2. A vehicle wheel comprising a central body and an outer tire receiving rim divided in the plane of the wheel thereof into inner and outer wheel sections having lapped rim portions provided with registered openings, said inner wheel section being dished, and said dished portion constituting a part for connection with an axle, locking means for securing together the lapped rim portions and including locking bolts mounted upon and within the dished part of the inner wheel section and movable radially into and out of register with registered openings of the lapped rim portions to prevent lateral separation and relative rotation of the wheel sections, and control means for the locking means, said control means being carried by and located within the dished portion of the inner wheel section.

CLYDE H. LINN.